April 27, 1965
L. ROSENMAN
3,181,016
PIEZOELECTRIC TRANSDUCER ARRANGEMENT
Filed July 30, 1962
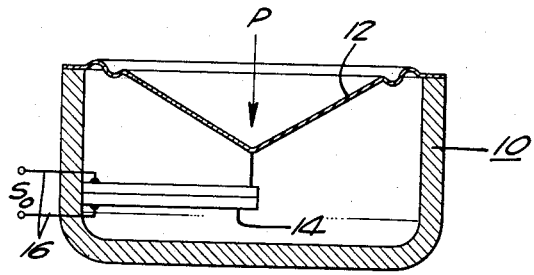
FIG. 1.
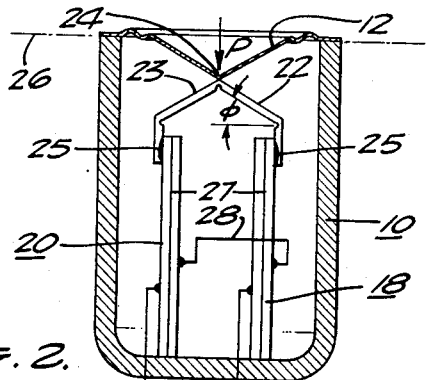
FIG. 2.
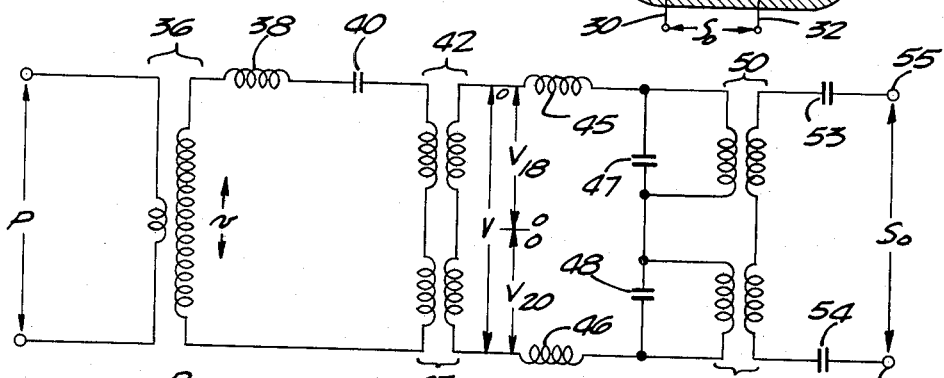
FIG. 3.
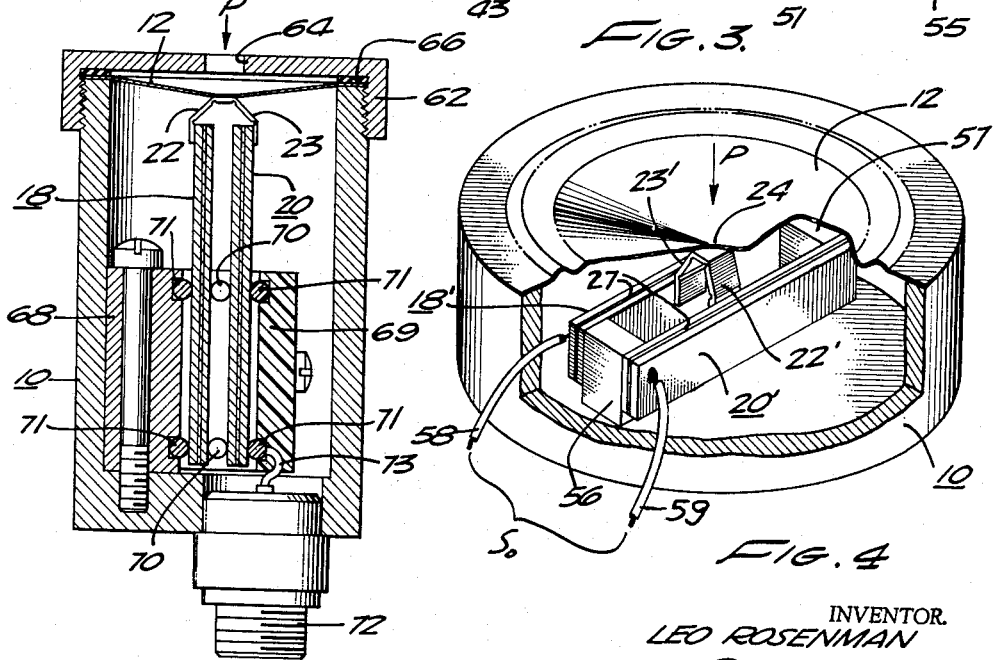
FIG. 5.
FIG. 4
INVENTOR.
LEO ROSENMAN
BY David C. Ogden
ATTORNEY

United States Patent Office 3,181,016
Patented Apr. 27, 1965

3,181,016
PIEZOELECTRIC TRANSDUCER
ARRANGEMENT
Leo Rosenman, Van Nuys, Calif., assignor to The Aerospace Corporation, Los Angeles, Calif., a corporation of California
Filed July 30, 1962, Ser. No. 213,447
13 Claims. (Cl. 310—8.3)

The present invention relates to electromechanical transducers and, more particularly, to sound wave phenomena using piezoelectric transducer arrangements.

One type of electromechanical transducer is a device which provides an electrical signal in response to a pressure stimulus. These devices may be designed to serve many purposes in many different environments. My invention relates to the class of transducer useful in measuring small dynamic pressures wherein sensitivity, size, frequency response and the like are controlling parameters. Moreover, I prefer to use self generating transducers such as those using piezoelectric elements which require no external source of power.

Mechanically driven piezoelectric elements are ordinarily displacement sensitive which means that the elements are precharged (polarized) so that the electrical output is proportional to the displacement of the driven portion of the piezoelectric element. The displacement of a resonant system is independent of frequency for a constant force and for frequencies below the mechanical resonance frequency. Thus, piezoelectric transducers will produce an output independent of frequency below resonance and the output will drop rapidly above resonance. In the vicinity of the resonance frequency, the output will depend on the degree of mechanical damping present in the system. It is therefore a common objective of transducer design to provide as high a resonance frequency as possible. This can be achieved by providing a stiff mechanical system but since the output is proportional to the displacement, it may be seen that high resonance frequency and high sensitivity tend to be incompatible. The design objective must therefore be modified to provide as high a resonance frequency as possible consistent with the sensitivity requirement.

A variety of piezoelectric transducers are commercially available, some being suitable for high sensitivity use, such as microphones and others for low sensitivity, such as high pressure instrumentation. However, in hypersonic shock tunnels, the available equipment leaves much to be desired. Piezoelectric microphones with high sensitivity are usually bulky and are not suited for shock tunnel testing. Although some of the piezoelectric transducers designed for high pressures might be dimensionally suitable, they are usually of inadequate sensitivity, because of the high mechanical stiffness required to withstand the high pressures. In addition, both types of prior art transducers suffer from a tendency to respond to the vibrational environment which often makes impossible the obtaining of signal information. For low density shock tunnel measurements the requirement for high sensitivity and small size make it imperative that a high degree of transducer efficiency be achieved in order to maintain the resonance frequency at a sufficiently high value.

Therefore, a primary object of the present invention is to provide a simple and reliable piezoelectric transducer arrangement suitable for low density shock tunnel environments.

The subject matter which is regarded as my invention is particularly pointed out and distinctly claimed in the concluding portion of this specification. The invention, however, as to its organization and operation, together with further objects and advantages thereof, will best be understood by reference to the following description taken in connection with the accompanying drawing in which:

FIG. 1 is a simplified schematic drawing exemplifying a conventional construction of an equipment in the art of the present invention;

FIG. 2 is a schematic diagram illustrating one embodiment of of the present invention;

FIG. 3 is a circuit diagram analogy of the present invention;

FIG. 4 is perspective view partially cut away to illustrate another embodiment of the present invention; and FIG. 5 illustrates an additional embodiment of my invention.

Referring now to the drawing, wherein like numbers refer to similar parts, there is shown in FIG. 1 a cup shaped support housing 10, positionable in an environment having a pressure signal P. Mounted on an exposed surface of the housing 10 is a signal responsive mechanical device such as pressure sensitive diaphragm 12 which is coupled to a cantilevered ceramic piezoelectric crystal arrangement usually referred as a bimorph element 14. An output signal $S_o$ is obtained from the leads 16 which are coupled to the opposite surfaces of the element 14. The ceramic bimorph element 14 is polarized or charged so that the leads 16 will sense the output signal in proportion to the deflection of the element. Basically the operation is that a pressure signal wave P deflects the diaphragm 12 to bend the element 14. This results in a compression of one surface of the element 14 and a tension in the other so that a positive electrical signal will appear on one of the leads 16 and a negative signal to the other. Opposite deflection of the diaphragm 12 reverses the deformation of the element 14 and the voltage of the signal information of the signal output $S_o$.

However, with this type of construction, wherein the pressure signal P is applied at the end of the element 14, the diameter of the housing 10 must be approximately twice the length of the element 14. Moreover, the mass and compliance of the bimorph result in its being sensitive to vertical vibrations of the housing 10. Changing the mass and compliance to avoid vibrational sensitivity often results in reduced signal sensitivity ($S_o/P$) or impracticable stress characteristics. Other constructions of this general nature, such as supporting a bimorph element at both ends and applying the deflection force to the middle, or supporting one end and the center and applying the signal to the other end, do not avoid the problem of vibrational sensitivity.

Referring now to FIG. 2, I have shown the housing 10 as supporting the diaphragm 12 in a manner substantially similar to that shown in FIG. 1. However, the arrangement of the parallel piezoelectric beams 18 and 20, in accordance with my invention is substantially different in its operation because of the coupling arrangement illustrated as a bifurcated lever having arms 22 and 23 coupled to the apex 24 of the diaphragm 12 and each coupled to one end of the pair of similary polarized cantilever beams 18 and 20. The beams 18 and 20 are each piezoelectric ceramic bimorph elements. Because of the fragility of most active piezoelectric materials, I prefer that the lever arms 22 and 23 be secured to the free ends of the beams by insulating glue such as a minute drop of epoxy resin as indicated at 25. Using an insulating glue allows the arms 22 and 23 to be fabricated of a metal. Similarly, I usually prefer to use a resilient metal for the diaphragm 12. Moreover, in the present discussion the plane 26 of the diaphragm 12 is defined as the plane perpendicular to the motion of the apex 24 in response to pressure signal P. The deflection of the beam ends is substantially parallel to this plane of the diaphragm. Such operation is accomplished by the beams 18 and 20 being perpendicular to the plane 26 of the diaphragm in the sense that their neutral planes 27 are perpendicular.

In order that the error signals, because of lateral vibrations of the housing 10, may be effectively eliminated, the lead wires 28, 30 and 32 are coupled to the surfaces of the simularly polarized beams 18 and 20 in a cumulative series arrangement so that the signal derived from vectorally similar lateral motion tends to cancel out. However, because of this coupling, opposed lateral motion caused by vertical motion of the diaphragm 12 results in additive output signal $S_o$ from the cantilever beams 18 and 20. Thus, vibrational noise is substantially inhibited while signal information is enhanced.

In order that the advantages of the present invention may be clearly understood, I have illustrated in FIG. 3 an equivalent circuit diagram. The transformer 36 represents the conversion of fluid pressure to a mechanical force by means of the effective area of the diaphragm 12. The inductance 38 represents the mass of the diaphragm 12, the capacitor 40 represents the compliance of the diaphragm 12, the transformers 42 and 43 represent the relative motion of the apex 24 and the ends of the beam 18 and 20 respectively (which are mathematically equivalent to $\tan \phi : 1$, $\phi$ being the lever arm drive angle illustrated in FIG. 2); the inductances 45 and 46 representing the bimorph element masses; and the capacitors 47 and 48 representing the element compliances. With proper polarization of the bimorph elements 18 and 20 and the proper coupling of the lead wires 28, 30 and 32, the signal voltage V will appear in the system and the vibrational voltages $V_{18}$ and $V_{20}$ are 180° out of phase and will cancel as indicated. The output signal $S_0$ is obtained across the transformers 50 and 51 which are equivalent to the electromechanical transducer ratio, with capacitors 53 and 54 being the blocked electrical capacitances of the bimorph elements 18 and 20 respectively. Cursory analysis of FIGS. 2 and 3 indicates that the transformers 42 and 43 provide a 1 to 1 "turns" ratio when $\phi$ is 45°. In effect this means that at $\phi$ equals 45°, for every millimeter vertical motion of the apex 24 the ends of the beams 18 and 20 will move in opposite directions and each move a millimeter. This ratio is changed by altering the lever arms 22 and 23 etc., to change the drive angle $\phi$.

The sensitivity of the present invention is the output divided by the input or simply $S_o/P$. Analysis of the circuit of FIG. 3 shows that the signal sensitivity $S_o/P$, for frequencies below the resonance frequency, is $$\frac{S_o}{P} = \frac{NA}{\tan \phi + \frac{C_c}{2C_d \tan \phi}}$$

where:

N is the electromechanical transducer ration,
A is the diaphragm effective area,
$C_c$ is the compliance of each bimorph; and
$C_d$ is the diaphragm compliance.

This trigonometrical relation shows that for maximum signal sensitivity $2 \tan^2 \phi$ must equal the compliance of bimorphs divided by the compliance of the diaphragms. Thus, it becomes apparent that the lever arm drive angle $\phi$ is a convenient means for sensitivity control.

Again referring to FIG. 3, analysis of the effect of vibrational forces may be accomplished as follows; for vibrations in the flexural plane of the bimorph elements 18 and 20, the effect will appear as the pair of voltages $V_{18}$ and $V_{20}$ inserted in the diagram adjacent to the inductances 45 and 46 representing the masses of the bimorph elements. The magnitude of the voltages $V_{18}$ and $V_{20}$ will be equal to the mass of the elements times the acceleration of the vibrational stimulus. In accordance with my invention, the polarity of the two voltages $V_{18}$ and $V_{20}$ is opposed so that no resultant output will appear at the output terminals 55. For vibration along the axes of the diaphragm 12, the effect will appear as a voltage V adjacent to the inductance 38 representing the mass of the diaphragm. This voltage V will be a function of the mass of the diaphragm times the acceleration of the vibrational stimulus. Because of such vibration, a noise output will appear at the terminals 55. However, this output will be substantially less than that of FIG. 1 where the noise output results from the combined mass of the diaphragm 12 and bimorph element 14.

Referring now to FIG. 4, I have illustrated another embodiment of my invention wherein the drive arms 22' and 23' are mechanically secured to a pair of piezoelectric bimorph beams 18' and 20' which are supported at their ends by a pair of conductive supporting blocks 56 and 57 with the neutral planes 27 still perpendicular to the plane of the diaphragm 12. In this particular embodiment I prefer to connect the lever arms 22' and 23' to the inner surface of the beams 18' and 20' by a conducting glue, such as a conducting epoxy resin, and to polarize the beams oppositely so that the output signal $S_o$ is obtained from the outer surfaces of the beams as illustrated by the lead wires 58 and 59 respectively. The grounding of the inner surface simplifies the electrical balancing of the system. This support arrangement is substantially less fragile than that of FIG. 1. However, the analogies discussed above in connection with FIGS. 2 and 3 still apply, and I am able to obtain maximum signal sensitivity $S_o/P$.

A complete microphone transducer arrangement is illustrated in FIG. 5, wherein an aluminum diaphragm 12 is substantially protected by a cap 62 secured to the housing 10. The pressure signal P reaches the diaphragm 12 through one or more apertures 64 in the cap 62. Also, I prefer to use a resilient support washer 66 in this arrangement. The lever arms 22 and 23 are secured to the beams 18 and 20 on the outer surfaces of the ends thereof by a non-conducting glue such as epoxy adhesive. Alternately, the lever may be of Mylar or other plastic. The beams are supported by a metal support member 68 and an insulating clamp 69 which provide compressed contact of resilient hollow stainless steel tubes 70 and conductive copper or brass rods 71. Unlike the signal lead arrangement of FIG. 2, this configuration uses two bimorph elements which are oppositely polarized during fabrication. This permits both inside surfaces to be connected together by the metal tubes 70 and an outside bimorph surface to be grounded through one of the metal rods 71 and the support member 68, thus simplifying the construction. The output signal $S_o$ is coupled to the outer surfaces of the beams 22 and 23 through a ground connection 72 and a hot lead 73 of a coaxial cable to transmit the output signal information $S_o$ to recording or other equipments. The electrical coupling of this arrangement is simplified compared to FIGS. 2 and 4. Obviously, many different sensitivities $S_o/P$ and frequency responses may be designed into components of the configuration illustrated in FIG. 5, whereupon any one of these designs may be used as required for a particular operation.

While I have shown and described particular embodiments of the present invention, further modifications may occur to those skilled in the art. For instance, the bimorph elements may be coupled in a parallel arrangement, instead of the series arrangements illustrated, if care is taken to balance the elements electrically to eliminate vibrational noise. I desire it understood, therefore, that the appended claims cover all such modifications which do not depart from the true spirit and scope of my invention.

I claim:

1. An electromechanical pressure transducer for determining fluid pressure changes in environments subject to mechanical vibrational considerations, comprising:

a cup-shaped housing having an orifice at one end thereof;

a diaphragm positioned to intercept fluid pressure changes traversing the orifice of said housing;

a pair of bimorph elements secured within said housing and having their neutral planes respectively perpendicular to the plane of the diaphragm;

a pair of lever arms coupled respectively to an adjacent portion of each of said elements and said diaphragm whereby motion of said diaphragm in a direction perpendicular to the plane thereof imparts motion to said elements parallel to the plane of the diaphragm; and lead wires coupled to said elements for extracting signal information, the polarization of said elements and the connections of said lead wires being such that opposing lateral motion of said elements in response to deflection of said diaphragm cumulatively develops signal information while vectorally similar lateral motion of said elements as a function of an vibrational environment, tends to cancel.

2. An electromechanical pressure transducer for detecting fluid pressure changes in an environment subject to mechanical vibrational considerations, comprising:

a cup-shaped housing having an orifice at one end thereof;

a diaphragm positioned to intercept fluid pressure changes traversing the orifice of said housing;

a pair of ceramic bimorph elements secured within said housing and having their neutral planes respectively perpendicular to the plane of said diaphragm;

a pair of lever arms coupled respectively between an adjacent portion of each of said elements and said diaphragm whereby motion of said diaphragm in a direction perpendicular to the plane thereof imparts opposed motion to said elements parallel to the plane of the diaphragm, the drive angle $\phi$ of each of said arms being equal whereby each of said elements responds a substantially identical magnitude to motion of said diaphragm; and lead wires coupled to said elements for extracting signal information, the polarization of said elements and the connections of said lead wires being such that opposing lateral motion of said elements in response to deflection of said diaphragm cumulatively develops signal information while vectorally similar lateral motion of said elements as a function of the vibrational environment, cancels.

3. An electromechanical pressure transducer for determining fluid pressure changes in environments subject to vibrational considerations, comprising:

a cup-shaped housing having an orifice at one end thereof;

a diaphragm positioned to intercept fluid pressure changes traversing the orifice;

a pair of ceramic piezoelectric beams secured within said housing perpendicular to the plane of said diaphragm;

a pair of lever arms coupled respectively to the adjacent free end of each of said beams and said diaphragm whereby motion of said diaphragm in a direction perpendicular to said plane imparts motion to the ends of said beams parallel to said plane; and lead wires coupled to said beams for extracting signal information, the polarization of said beams and the connections of said lead wires being such that opposing lateral motion of the ends of said beams in response to deflection of said diaphragm develops cumulative signal information while vectorally similar lateral motion of said beams, as a function of the vibrational environment, tends to cancel, said pair of arms each defining a drive angle $\phi$ relative to said plane which angle $\phi$ may be varied to control the signal sensitivity of the transducer.

4. In an electromechanical pressure transducer for determining fluid pressure changes in environments subject to mechanical vibrational considerations, and of the type using a housing having an orifice at one end thereof and a diaphragm positioned to intercept fluid pressure fluctuations traversing the orifice, a transducing arrangement comprising:

a pair of ceramic piezoelectric beams secured within the housing perpendicular to the plane of the diaphragm;

a pair of lever arms coupled respectively between an adjacent drivable portion of each of said beams and the diaphragm whereby motion of the diaphragm in a direction perpendicular to said plane imparts motion to said drivable portion parallel to said plane; and lead wires coupled to said beams for extracting signal information, the polarization of said beams and the connections of said lead wires being such that opposing lateral motion of said beams in response to deflection of the diaphragm develops signal information while vectorally similar lateral motion of said portions, as a function of the vibrational environment, result in signals which cancel, said pair of arms each defining equal drive angles $\phi$ relative to said plane which angle $\phi$ may be varied by design to control the signal sensitivity of the transducer.

5. In an electromechanical pressure transducer for detecting fluid pressure changes in an environment subject to mechanical vibrational considerations having a housing defining an orifice and a diaphragm positioned to intercept fluid pressure changes traversing the orifice, a transducing arrangement comprising:

a pair of bimorph elements secured with their neutral planes respectively perpendicular to the plane of the diaphragm;

a pair of lever arms coupled respectively between an adjacent portion of each of said elements and the diaphragm whereby pressure fluctuation induced motion of the diaphragm in a direction perpendicular to the plane thereof imparts opposed lateral motion in said elements parallel to the plane of the diaphragm, the drive angle $\phi$ of each of said arms being equal whereby each of said elements responds a substantially identical magnitude to motion of said diaphragm; and means coupled to said elements for extracting signal information $S_o$ so that opposing lateral motion of said elements in response to a pressure signal P cumulatively develops signal information while vectorally similar lateral motion, as a function of the vibrational environment, cancels whereby signal sensitivity $S_o/P$ is of function of $\tan^2\phi$.

6. In an electromechanical pressure transducer for developing an output signal $S_o$ in response to a fluid pressure signal P within an environment subject to mechanical vibrational considerations, the transducer having a housing defining an orifice and a diaphragm positioned to intercept fluid pressure changes traversing the orifice, a transducing arrangement comprising:

a pair of bimorph elements secured with their neutral planes respectively perpendicular to the plane of the diaphragm;

a bifurcated lever coupling at drive angles $\phi$ an adjacent portion of each of said elements to the diaphragm, the drive angle $\phi$ of each of said arms being equal so that each of said elements responds a substantially identical magnitude to the pressure signal P induced motion of said diaphragm, whereby signal sensitivity $S_o/P$ is of function of $\tan^2\phi$; and means coupled to said elements for extracting an output signal $S_o$ in response to pressure signal P while cancelling noise developed by similar lateral motion of said elements as a function of the vibrational environment.

7. In an electromechanical pressure transducer for determining fluid pressure changes in environments subject to mechanical vibrational considerations and of the type having a diaphragm positioned to intercept fluid pressures fluctuations, a transducing arrangement comprising:

a pair of oppositely polarized parallel ceramic bimorph elements secured with a free end of each being adjacent to the diaphragm, said pair of elements having a pair of inner surfaces and a pair of outer surfaces;

a bifurcated lever coupled respectively between said free ends and the diaphragm whereby pressure signal induced motion of the diaphragm imparts lateral motion to said free ends in a direction perpendicular to the neutral planes of said pair of elements; one pair of said element surfaces being coupled together; and lead wires coupled to the other pair of said element surfaces for extracting signal information.

8. In an electromechanical pressure transducer for determining fluid pressure changes in environments subject to mechanical vibrational considerations and of the type using a housing having a diaphragm positioned to intercept fluid pressure fluctuations, a transducing arrangement, comprising:

a pair of oppositely polarized ceramic bimorph elements resiliently secured within the housing and having their major axes perpendicular to the plane of the diaphragm;

a bifurcated lever in a plane perpendicular to the neutral planes of said pair respectively for coupling the adjacent drivable end portion of each of said pair to the diaphragm whereby pressure signal responsive motion of the diaphragm imparts perpendicular and opposed motion to said portions;

resilient spacer means electrically coupling the inner surfaces of said pair of a point remote from said portions;

a lead wire coupled to one outer surface to said pair for extracting signal information; and grounded circuit means coupled to the other outer surfaces of said pair whereby opposing lateral motion of said portions develops signal information.

9. In an electromechanical transducer for determining signal variations in environments subject to mechanical vibrational considerations and of the type having a mechanical device positioned to intercept signal variations, a transducing arrangement comprising:

a pair of oppositely polarized parallel ceramic bimorph cantilevered elements each having one end secured and its other end being free and being adjacent to the said mechanical device, said pair of bimorph elements having a pair of inner surfaces and a pair of outer surfaces;

a bifurcated lever coupled respectively between the free ends of the bimorph elements and the device so that signal induced motion of the device imparts equal and opposite lateral motion to said free ends in a direction perpendicular to the neutral planes to effect flexing thereof;

one pair of said element surfaces being electrically coupled together; and lead wires coupled to the other pair of said element surfaces for extracting signal information.

10. In an electromechanical transducer for determining signal variations in environments subject to mechanical vibrational considerations and of the type having a mechanical device positioned to intercept signal variations, a transducing arrangement comprising:

a pair of oppositely polarized ceramic bimorph elements resiliently secured to have their major axes parallel to the motion of the mechanical device in response to signal variations;

a bifurcated lever having divergent axes in a plane perpendicular to the neutral planes of said pair of bimorph elements respectively and coupling the adjacent drivable end portion of each of said pair to the device so that signal responsive motion of the device imparts opposite lateral motion to said end portions;

resilient spacer means coupling the inner surfaces of said pair at a point remote from said end portions;

a lead wire coupled to one outer surface of said pair for extracting signal information; and grounded circuit means coupled to the other outer surface of said pair whereby opposite lateral motion of said pair develops signal information between said lead wire and said grounded circuit means.

11. In an electromechanical transducer for determining signal variations in environments subject to mechanical vibrational considerations and of the type having a mechanical device positioned to intercept signal variations, a transducing arrangement comprising:

a pair of similarly polarized parallel ceramic bimorph elements each having an inner and an outer ceramic surface and each secured with a free end adjacent to the mechanical device;

a bifurcated lever coupled respectively between the said free ends and the device so that signal induced motion of the device imparts equal and opposite lateral motion to said free ends in a direction perpendicular to their neutral planes;

a lead shunt coupling the outer surface of one of said elements to inner surface of the other said element; and a pair of lead wires coupled to the other of said surfaces of said bimorph elements not coupled by said lead shunt for extracting signal information.

12. In an electromechanical transducer for determining signal variations in environments subject to mechanical vibrational considerations and wherein a mechanical device is positioned to intercept signal variations, a transducing arrangement comprising:

a pair of parallel oppositely polarized ceramic bimorph elements positioned to have their major axes parallel to the motion of the mechanical device when responding to signal variations;

a bifurcated lever mechanically coupling the adjacent drivable end portion of each of said pair of bimorph elements to the mechanical device so that signal responsive motion of the device imparts equal and opposite lateral motion to said end portions in a direction perpendicular to the neutral plane of each of said pair;

resilient spacer means electrically coupling the inner surfaces of said pair at a point remote from said end portions; and circuit means coupled to the outer surfaces of said pair for extracting signal information.

13. In an electromechanical transducer for determining signal variations in environments subject to mechanical vibrational considerations and wherein a mechanical device is positioned to intercept signal variations, a transducing arrangement comprising:

a pair of oppositely polarized ceramic bimorph elements positioned to have their major axes parallel to the motion of the mechanical device when responding to signal variations;

a bifurcated lever mechanically coupling the adjacent drivable end portion of each of said pair of bimorph elements to the mechanical device so that signal responsive motion of the device imparts equal and opposite lateral motion to said end portions in a direction perpendicular to the neutral plane of each of said pair;

means for resiliently supporting said pair at a point remote from said end portions; and electric circuit means coupled to the surfaces of said pair for extracting signal information and inhibiting vibrational noise signals.

References Cited by the Examiner

UNITED STATES PATENTS 3,002,056  9/61  Batsch et al. _____ 179—100.41
3,057,971  10/62  Wood _____ 179—100.41

MILTON O. HIRSHFIELD, *Primary Examiner.*